United States Patent [19]
Crapuchettes

[11] 3,780,252
[45] Dec. 18, 1973

[54] MICROWAVE OVEN POWER SUPPLY CIRCUIT

[75] Inventor: Paul Wythe Crapuchettes, Woodside, Calif.

[73] Assignee: Litton Systems, Inc., San Carlos, Calif.

[22] Filed: July 20, 1972

[21] Appl. No.: 273,615

[52] U.S. Cl. ............... 219/10.55, 307/293, 323/24, 331/86
[51] Int. Cl. ............................................. H05b 9/06
[58] Field of Search .................... 219/10.55; 323/24, 323/34; 307/293; 331/86

[56] References Cited
UNITED STATES PATENTS

| | | | |
|---|---|---|---|
| 3,624,334 | 11/1971 | Chapell | 219/10.55 |
| 3,665,293 | 5/1972 | Keiler et al. | 323/24 |
| 3,667,030 | 5/1972 | Gordon et al. | 323/24 |
| 3,524,997 | 8/1970 | Harnden, Jr. et al. | 307/293 |

*Primary Examiner*—R. F. Staubly
*Assistant Examiner*—Hugh D. Jaeger
*Attorney*—Ronald M. Goldman

[57] ABSTRACT

A microwave oven power supply includes a synchronous switch and a phase control circuit. The switch is electrically connected in series with the supply lines which, until actuated, maintains normally open the path for current flow to the transformers and other electrical components found within the oven power supply. An On-Off switch and interlocks are in series with the power line and an electrical circuit completed through the phase control circuit inhibits the operation of the power circuit until it is desired to commence cooking operations. The phase control circuit determines the proper phase of the applied line voltage for which the synchronous switch should be initiated. By design, this phase control circuit is matched to the transformer characteristics and senses the magnitude of the applied line voltage so that initial conduction of the synchronous switch falls within a preselected range which has been determined to minimize transient voltage spikes and/or in-rush current transients. In this way, the initiation of current flow in the high voltage transformer and filament transformer and other oven elements is delayed until the sinusoidal voltages of the power line are in the phase relationship that I have determined to be proper.

17 Claims, 7 Drawing Figures

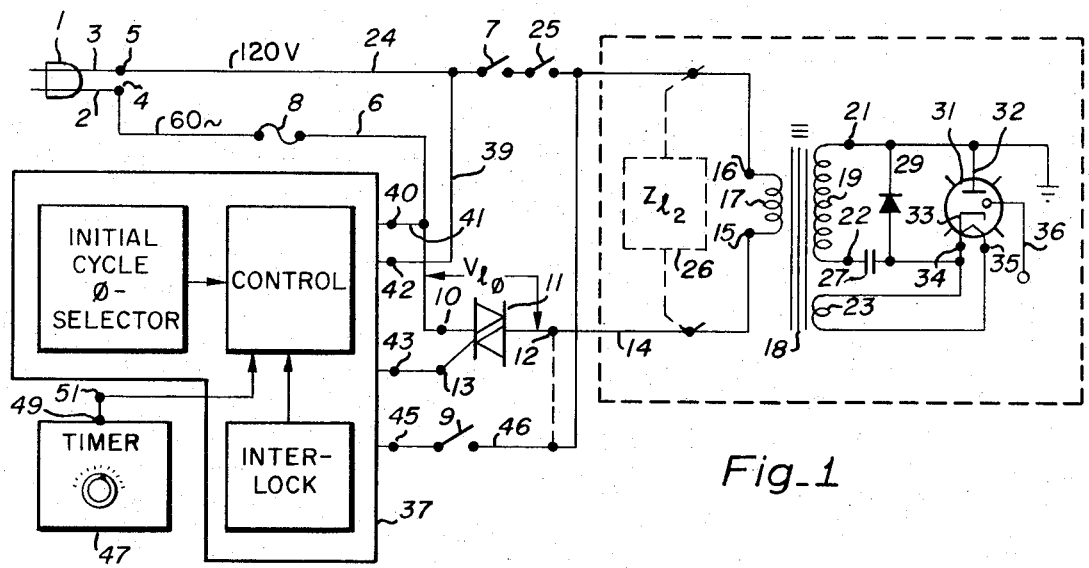
Fig_1
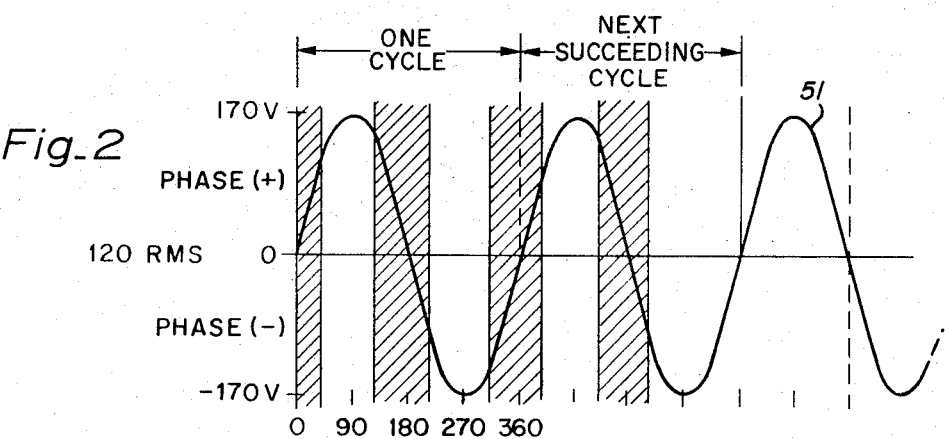
Fig_2
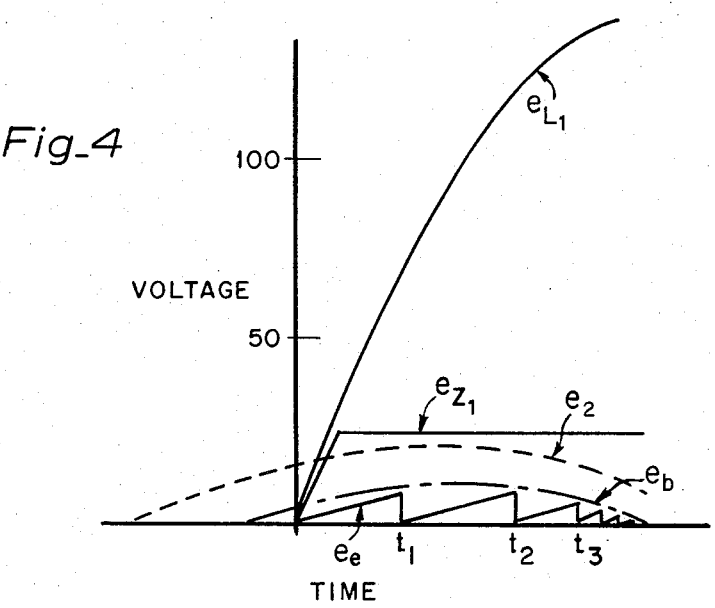
Fig_4

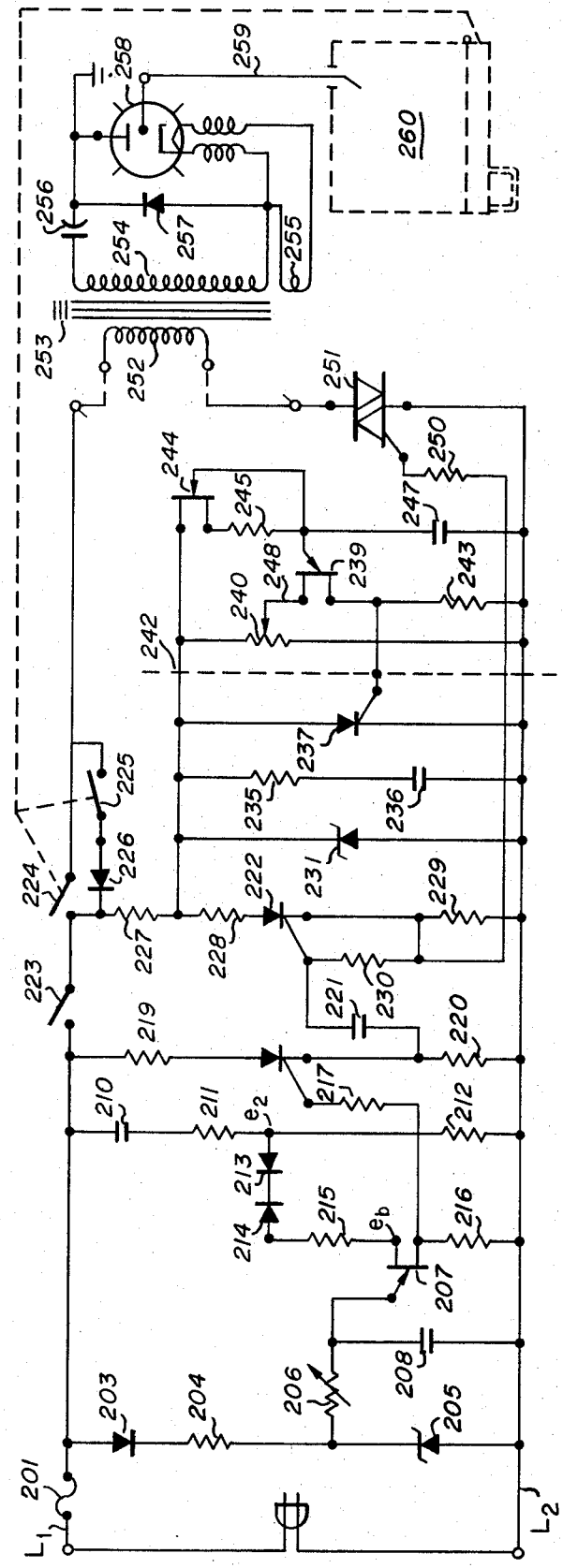
Fig_3

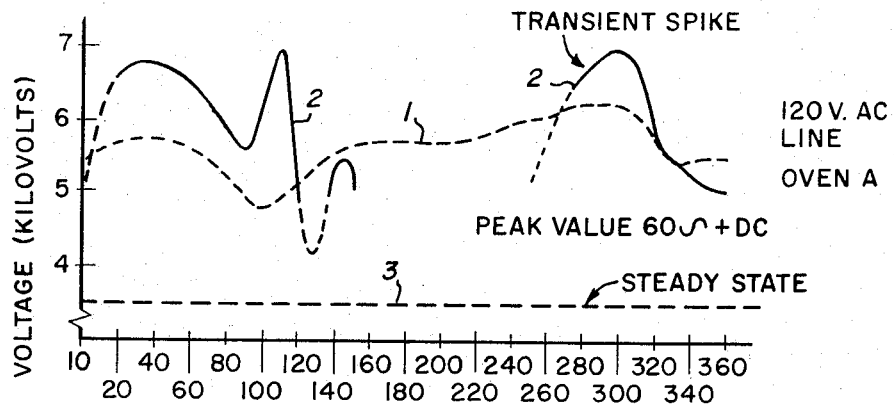
Fig_5
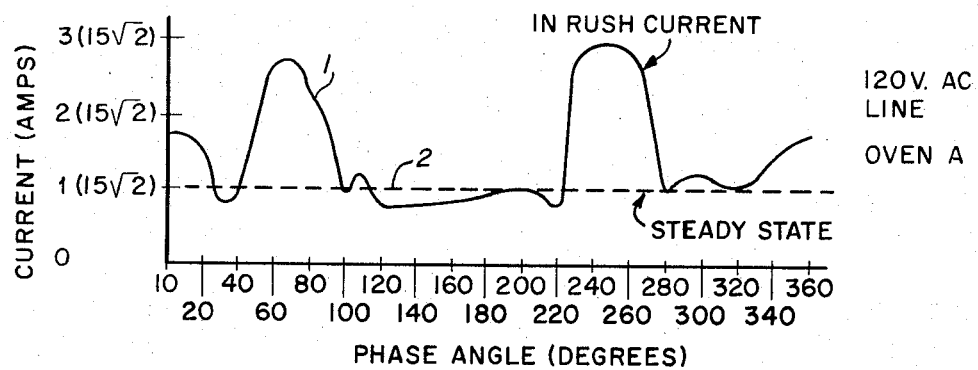
Fig_6
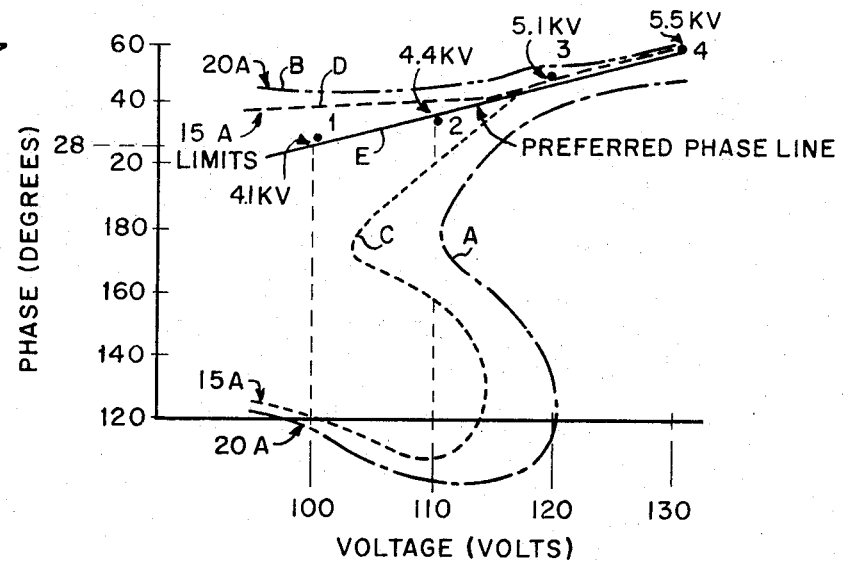
Fig_7

MICROWAVE OVEN POWER SUPPLY CIRCUIT

FIELD OF THE INVENTION

This invention relates to microwave ovens and, more particularly, to a power supply for a microwave oven.

BACKGROUND OF THE INVENTION

The microwave oven is a now familiar appliance used to heat or cook foodstuffs through exposure to microwave energy. Conventionally, the microwave oven includes an oven housing, a cooking cavity into which food is introduced, a microwave energy source, and means to feed the microwave energy from the source into the cooking cavity. Substantially all microwave ovens employ a microwave tube of the type known as a "magnetron" as the microwave energy source. And a source of high voltage and filament voltage are included, with still additional electrical components and circuits, as part of a power supply for energizing the magnetron.

One high voltage circuit for the magnetron is the high voltage transformer half-wave voltage doubler combination. In this, a high leakage reactance high voltage transformer steps up AC line voltage, typically on the order of 120 volts, to a high AC voltage, on the order of 1.7 kilovolts, and this high voltage is doubled and rectified to provide a pulsating uni-directional voltage on the order of 3.4 kilovolts which is applied across the anode and cathode electrodes of the magnetron. Such a doubler is found in a modified version in the Radio Engineer's Handbook, Terman, 1943, pages 592 and 593, and may be the "Villard" circuit. In this circuit arrangement, a capacitor is included in a series with the output the transformer high voltage secondary winding. The magnetron, which as is known exhibits a biased diode-like electrical characteristic, is connected electrically in parallel with a rectifier diode and in opposite polarity thereto so that when the applied alternating voltage is of one polarity, current flows through the diode and does not flow through the magnetron and vice versa when the alternating voltage reverses polarity. One one-half cycle of the alternating voltage from the secondary winding the rectifier diode conducts current to charge the capacitance. On the alternate half-cycle of alternating voltage the polarity of the DC voltage resulting from the charge stored in the capacitor "adds" in-phase with the voltage appearing at that time across the transformer secondary winding to provide a uni-directional voltage, equal in value to approximately twice the level of the voltage across the transformer secondary winding, across the parallel combination of the diode and the magnetron for this half of the AC cycle. On this half-cycle of alternating voltage the rectifying diode is back-biased and does not conduct current and the magnetron is forward biased and conducts current.

Although other voltages multiplying and rectifying circuits have been used in microwave oven power supply circuits, the full wave voltage doubler and a full wave bridge rectifier for example, the half-wave voltage doubler uses the fewest number of components and is therefore less expensive to manufacture and install.

The primary winding of the high voltage transformer receives electrical power from the line voltage source, typically 120-volt, 60-cycle AC, connected into the oven housing by an electrical power cord.

Numerous other electrical elements are located within the oven housing. These include an electrical motor driven blower to direct cooling air on the magnetron and ventilate the oven, various relays and control circuits. All of these devices form part of the electrical load and influence the line current supplied over the power cord.

The microwave oven has achieved a meritorious record of high reliability in service. However, there are instances in which the rectifier diode, the magnetron or other oven components fail for unexplained reasons: A magnetron becomes inoperative because of arching between its internal elements or the diode of the rectifying circuit becomes inoperative, or the safety interlocks become ineffective. The component part manufacturer designs a component to fit certain electrical specificiations for operation under specified maximum conditions, whether maximum current or voltage or both. Obviously, it is exceedingly difficult to trace down a cause of component failure once the component is destroyed, and it is possible to acept as reason for the failure an inherent or latnet defect in the material or contruction of that one particular component; reasoning that on a statistical basis, some percentage of any device manufactured, no matter how well designed, will, as consequence of the mass production techniques, fail.

Philosophically, in part, an advantage of mass production techniques is that it provides abundant quantities of products at prices which the majority of persons can afford to pay. In so doing, the manufacturer makes practical cost compromises; whether it be in the materials used, the design of the product, the degree of supervision of employees assembling the products, and the extent of testing. Thus the small incidence of failure of diodes or magnetrons or interlocks even after examination and inspection, was attributed to an inherent defect prior to my discovery and invention. However, I have discovered that some such failures are caused by high transient voltages and currents of very short duration that can occur at specific times and that these phenomena are related to the circuit conditions in the power supply at the instant at which power supply current commences to flow.

Unexpectedly, I have discovered also that the invention which eliminates the transient voltage spikes minimizes in-rush current flow.

In a prior invention for which I have made patent application, there is revealed another more widely known problem which in one manner I have solved. An in-rush current can be caused during the few seconds in which the magnetron filament is being heated and goes from a "cold" to a "hot" condition. In one specific example, a magnetron heater can draw initial current of 60 to 100 amps in the cold codition as compared to a 20 ampere normal current draw after warm-up. This substantial change in current levels and the large initial currents clearly adversely influence the service life of the component elements and is best avoided. And in some instances protective interlocks and relays have failed in their function because the electrical contacts thereof become fused together, which occurs when above level circuit currents cause decomposition of the contact material.

OBJECTS OF THE INVENTION

Accordingly, it is one object of my invention to reduce the transient electrical stresses placed upon microwave oven electrical components.

It is another object of my invention to increase the reliability and useful life of magnetrons and diodes in microwave oven power supply.

It is a further object of my invention to minimize or eliminate those transient conditions which can occur at the initiation of operation of a microwave oven power supply and which adversely affects the microwave oven components and increases the incidence of component failure.

It is an additional object of my invention to minimize oven interlock switch failure.

It is a still further object of my invention to minimize or eliminate the likelihood of destruction of either the magnetron or the rectifying diode in operation in a microwave oven.

And it is a still additional object of my invention to minimize or eliminate a potential transient voltage spike that might occur at the time of initiation of the high voltage power supply and to minimize the in-rush currents drawn by the microwave oven power supply during the warm-up period of the oven.

BRIEF SUMMARY OF THE INVENTION

In accordance with those objects and the invention, a microwave oven power supply includes a synchronous switch and a phase control circuit. The switch is electrically connected in series with the supply lines which, until actuated, maintains normally open the path for current flow to the transformers and other electrical components found within the oven power supply. An On-Off switch and interlocks are in series with the power line and an electrical circuit completed through the phase control circuit inhibits the operation of the power circuit until it is desired to commence cooking operations. The phase control circuit determines the proper phase of the applied line voltage for which the synchronous switch should be initiated. By design this phase control circuit is matched to the transformer characteristics and senses the magnitude of the applied line voltage so that initial conduction of the synchronous switch falls within a preselected range which has been determined to minimize transient voltage spikes and/or in-rush current transients. In this way, the initiation of current flow in the high voltage transformer and filament transformer and other oven elements is delayed until the sinusoidal voltages of the power line are in the phase relationship that I have determined to be proper.

Further in accordance with an additional aspect of my invention, a circuit completed through an oven door switch or door latch switch or both, inhibits and stops operation of the control circuit during the time that the oven door is opened or in the process of being opened, thus assuring that subsequent restart is in the correct phase.

In accordance with a still further aspect of my invention the particular phase angle at which the synchronous switch is permitted to conduct current is dependent upon the particular level of AC voltage on the power lines.

With my invention I have found that the surge current and transient voltages which I have found to occur during the initial cycle of alternating current applied to the circuit which, depending upon the phase of the voltage at the instant of turn-on, can be of such high levels that exceed the voltage capabilities of the diodes or of the magnetron or the current handling capability of the interlocks and, even though only of very short duration, either repetitively or as a result of a combination of other factors, was responsible for the premature failure of some diodes, magnetrons and interlocks, is minimized or entirely avoided.

In accordance with a still additional aspect of my invention, the control circuit includes a latch and turn-off control means, which in combination with the said synchronous switch ensures that the alternating current flow in the power supply will be full half sine waves (after the initial phase back of the first half cycle). In this way, electrical current arcing in switches opening in the oven current circuit is minimized inasmuch as the circuit is interrupted at a "zero" or no current flow condition, and the transformer core structure is properly magnetically biased in a neutral condition inasmuch as the magnetizing current in the transformer primary winding has been cycled to the zero condition.

The foregoing and other objects and advantages of my invention together with the elements comprising my invention, as well as substitutions and equivalents thereof, become more apparent from consideration of the detailed description of the preferred embodiments of my invention which follow, taken together with the figures of the drawings.

DESCRIPTION OF DRAWINGS

In the drawings:

FIG. 1 illustrates in block diagram a preferred embodiment of my invention;

FIG. 2 illustrates a sinusoidal voltage wave form discussed in connection with the embodiment of FIG. 1;

FIG. 3 illustrates schematically one specific embodiment of my invention constructed in accordance with the preferred form of FIG. 1;

FIG. 4 illustrates some voltage wave forms used in connection with the explanation of operation of the specific embodiment of FIG. 3;

FIG. 5 illustrates the peak voltage as a function of the line voltage phase at the instant of current turn-on for a particular oven power supply;

FIG. 6 illustrates the peak value of the line current as a function of the line voltage phase at the instant of turn-on for the same oven example used in connection with FIG. 6;

FIG. 7 illustrates contours of constant in-rush current in the phase-line voltage plane and the relationship between line voltage and preferred phase for another microwave oven.

DETAILED DESCRIPTION OF MY INVENTION

A simplified schematic of a microwave oven power supply constructed according to the teachings of my invention is presented in FIG. 1. In part, the conventional elements of the embodiment are indicated in functional block diagrams. For purposes of clarity, FIG. 1 omits entirely some conventional electrical and electromechanical components, such as the blower, lights, sequencing circuits, normally found within a complete microwave oven power supply and which are not necessary to the operation of or understanding of my invention. Those elements are conventional and are placed in circuit at conventional locations as is found in the prior art to which the reader can make reference, and they are hereinafter discussed in more detail in connection with additional specific embodiments. In practice a microwave oven construsted in accordance with the teachings of my invention contains such ancillary electrical equipment appropriately connected in the electrical circuits.

A power line cord is represented by plug 1 and conductor lead lines 2 and 3. Lines 2 and 3 are connected to terminals 4 and 5, respectively, within the microwave oven power supply. Plug 1 is to be inserted in the house power outlet which, typically, provides 120-volts 60-cycles alternating voltage. An electrical circuit path 6 is completed from terminal 4 through fuse 8, to one terminal 10 of a Triac switch 11. Terminal 12 of switch 11 is connected via lead 14 in circuit with terminal 15 of the primary winding 17 of power transformer 18. An electrical circuit 24 is completed between terminal 5 and the other end 16 of primary winding 17, in a series circuit with electrical interlock switch 25, and On-Off switch 7. Power transformer 18, typically a high leakage reactance transformer having primary and secondary windings wound side by side on a common core with, preferably, an iron shunt therebetween, includes a primary winding 17 with ends 15 and 16, a secondary high voltage winding 19 with ends 21 and 22, and an additional filament winding 23 wound over primary winding 17 and consisting of a small number of turns of heavy wire.

A capacitor 27 is connected between end 22 of secondary winding 19 and cathode terminal 34 of the magnetron tube 31. The negative polarity terminal of a rectifying diode 29, the anode terminal 32 of a magnetron microwave tube 31 and the transformer terminal 21 are connected to the chassis electrical common or "ground." The ends of filament winding 23 are connected across the heater-cathode terminals 34 and 35 of magnetron 21.

The magnetron is a conventional device which essentially converts electrically power supplied from a source of voltage into microwave frequency energy. An output transmission line 36, symbolically represented, extends between the magnetron and the cooking cavity, not illustrated, to couple microwave energy therebetween. Other conventional electrical components which are to receive line voltage and which form an electrical load are represented by the dashed lines 26 in FIG. 1 electrically connected in parallel with the primary 17 of the power transformer 18.

A phase establishing and control circuit, 37, illustrated in block diagram form, is provided. This circuit includes an input terminal 45 which is connected by lead 46 electrically in common with one side of the power line, line 24 via door interlock 9, or depending on the nature of the specific circuit employed, to line 14 indicated by the dash line connection; an output terminal 43, which is connected electrically to the trigger terminal 13 of Triac switch 11; power supply input terminals 40 and 42 which are connected to lines 6 and 24, respectively, by leads 41 and 39.

As is represented in the figure, the phase control circuit includes numerous functional elements. First, a part of the circuit is designated as an initial cycle phase selector and control. This functions to determine the appropriate phase of the line voltage to turn on the oven power. Secondly, a part of the circuit functions as a clamp to assure full cycles of alternating current after the initial turn-on transient. Thirdly, a turn-off control is provided to enable the circuit to turn off the power. Fourthly, electrical interlock or interlocks are included. A timer, represented by the numeral 47 in FIG. 1, has its output 49 connected electrically to input terminal 51 of the phase control circuit.

Timer 47 is of any conventional structure. In its simplest form the timer includes a timing mechanism by means of which the operator selects and controls the cooking time; and output circuit which provides an output immediately upon setting of the timer, or in more sophisticated circuits, a cook switch. In the latter instance, the timing mechanism does not function and an output does not appear until such cook switch is actuated by the operator. In operation, timer 43 provides a suitable control signal and at the end of the timing interval changes that signal.

In operation, plug 1 is inserted into the conventional home electrical outlet. Via power cord lines 2 and 3, 120-volt 60-cycle AC is presented across terminals 4 and 5 of the oven power supply circuit. Through fuse 8, line 6 is connected to terminal 10 of switch 11 and terminal 40 of control circuit 37. Another electrical circuit is completed between terminal 5, On-Off switch 7, normally closed interlock switch 25, line 24, primary winding 17, line 14, to terminal 12 of switch 11. A branch circuit via line 39 applies the potential at terminal 5 to terminal 42 of the control circuit 37. These circuits accordingly result in the application of the line voltage across Triac switch 11 and apply the voltage for powering control unit 37. Triac 11 is in its electrically nonconductive or "off" state and does not conduct current. At this time the food to be cooked, not illustrated, is inserted into the oven cavity, not illustrated, and the oven cavity door is closed. As the door is opened, interlock 9 opens first and then interlock switch 25 is opened until the door is closed again. Interlock 9 thereby removes the power source from the latching circuit in the controller, 37, as hereinafter becomes apparent, and thus prevents current from flowing through primary winding 17 or ancillary element 26, connected electrically in parallel with primary 17.

The oven door, not illustrated, is closed after the food-stuffs are inserted into the oven cavity.

At this time timer 47 is not yet actuated. Hence the timer output applied to an inhibit terminal of the control circuit 37 prevents operation of control circuit 37. Subsequently the operator sets timer 47 to the desired cooking time. At such time, timer 47 changes its output and removes the voltage placed at inhibit terminal 45. Timer 47 provides the new output until the time set upon the timer by the operator has elapsed. With such, the phase monitor and control circuit monitors the phase of the instantaneous alternating voltage (AC). The initial cycle phase control circuit, symbolically illustrated in FIG. 1, monitors the alternating voltage. When the phase of the voltage at input terminal 42 is at the predetermined phase angle, the circuit provides an output voltage at terminal 43. When the timer is set and the oven door remains closed, an internal latching circuit in control circuit 37 is connected to the line via terminal 45, switch 9 and lead 46. The latch circuit is fired and remains connected or latched until either the expiration of the timing cycle or until the door is opened, which opens the interlocks. This provides a continuous output at terminal 43 which in turn causes Triac switch 11 to remain in its current conducting state for the desired cooking time interval.

Switch 11 is desirably a Triac. The Triac is a type of semiconductor device which possesses the characteristic of, once having been placed in the current conducting state, i.e. "switched on," it continues to conduct current between its terminals, 10 and 12, independent of the signal or voltages at its input terminal 13, until such time as the current reduces to zero. In addition, the Triac is bi-directional and hence conducts current in either direction and the transition time for the Triac to switch into its conductive state is very short, on the order of microseconds. Thus, upon the application of a signal voltage at terminal 13, Triac 11 instantaneously conducts current and current flows from terminal 5 through primary winding 17 via lead 24 in a complete circuit to terminal 4 via switch 11 and lead 6. The phase monitoring and control circuit continues thereafter to provide appropriate voltage at input terminal 13 to maintain Triac 11 in its electrically conductive state on each subsequent half cycle of alternating current flow. Thus as the sinusoidal supply current presents a zero current condition through Triac 11 which would normally permit the Triac to shut off or become non-conductive at each half cycle, the voltage at output terminal 43 applied to terminal 13 causes the switch to remain conductive.

As is apparent, the exact manner or circuits for detecting the phase of the voltage at the instant cook cycle is to commence does not in any way limit the broad scope of the invention, inasmuch as other phase control circuits conventional in nature would suggest themselves as equivalents or substitutes. In such instance the exact sequence of operation between such alternative circuits and that indicated in this preferred embodiment may differ slightly. Once the line current flows at the predetermined initial phase, the control circuit maintains the current flow for the full cycle of each succeeding cycle of alternating current essentially until such time as the time set upon the timer 47 has elapsed.

With alternating current flow in primary winding 17, a high voltage, suitably 1.8 KV, is induced in the secondary winding ends 21 and 22. Likewise, the line voltage level is stepped down to approximately 5 volts heater voltage which appears across secondary winding 23. Filament winding 23 applies the voltage across the heater terminals of magnetron 31.

Magnetron 31 has the electrical characteristic of a biased off diode. That is, the magnetron conducts current from the anode to the cathode when the voltage on the anode is positive with respect to the cathode and exceeds a minimum value. Rectifier diode 29 is connected in parallel with, is oppositely poled from magnetron 31, and conducts current from its anode to its cathode terminal. Hence on negative half cycles of alternating voltage appearing thereacross, diode 29 conducts current and magnetron 31 does not, and vice versa on positive half cycles. The diode 29 and capacitor 27 are connected in a conventional rectifier voltage doubling circuit, ofttimes referred to as a half wave voltage doubler. Thus on the negative half cycle of alternating voltage current flows through diode 29 and charges capacitance 27 to full secondary voltage, V, positively. On the alternating half cycle of alternating voltage, a voltage, V, appears across winding 19. The polarity of this voltage is the same as that applied across capacitor 27. The voltages are additive and hence the voltage between the end of capacitor 27 and end 22 of the secondary winding and, accordingly, across magnetron 31, is a direct voltage having a level of substantially 3.6 KV.

Magnetron 31 so supplied with the appropriate voltages and currents generates microwave energy which is extracted from the evacuated regions of the magnetrons by means of an output lead 36. Lead 36, in turn, is connected to a transmission line, not illustrated, which couples that microwave energy to the cooking cavity or chamber, not illustrated, of the microwave oven. Similarly, line current flows through any additional electrical elements, load 26.

Upon the lapse of the time set upon timer 47, the timer reapplies an inhibit voltage output to the phase monitoring and control circuit to turn off switch 11 and prevent current flow.

As soon as the phase of the alernating current through Triac 11 approaches a multiple of 180° where the level of the current approaches zero, the potential difference across the terminals of Triac 11 is zero and Triac 11 restores very rapidly, on the order of microseconds, into its nonconductive state, inasmuch as further trigger is no longer applied to trigger 35. Triac 11 remains in its nonconductive state and prevents further current flow through primary winding 17.

As is apparent, the inherent mechanism of operation of Triac 11 is such that it allows for completion of at least a full half cycle of alternating current before interrupting current flow and, in this condition or phase, the voltage appearing across the power lines 1 and 2 is zero volts relative to ground.

In the preceding description, reference was made to a selected phase angle at which time it was desired to initially operate or commence current flow in the primary winding 17 of transformer 18. Alternatively, this may be given a converse meaning as well, namely preventing the commencement of current flow during predetermined phase angles of the supply alternating voltage. The manner of operation and selection of such phase angle is best understood in connection with the description and illustrations of FIG. 2.

In FIG. 2 I illustrate a sine wave 51 representative of the instantaneous levels and sinusoidal characteristic of the alternating voltage of the house supply, typically 120 volts, r.m.s., which may be characterized as $\overline{V}$ sin $\theta$, where V is the peak value of the voltage typically 170 volts. As may be conveniently seen on an oscilloscope or oscillogram or other measuring or display devices that depict the variation of voltage with time, the voltage across the line taking zero as a staring point increases in a positive direction to a peak of approximately 170 volts and thereupon decreases to zero. The polarity of the voltage then reverses and increases again to 170 volts and then decreases again to zero. Each cycle of this alternating voltage from zero through positive to zero through negative and again to zero is referred to as a cycle or one cycle of alternating current. The change of voltage from zero to a peak and again to zero is referred to as a half cycle of alternating voltage. As is illustrated in FIG. 2, the sinusoidal wave form 51 is shown through approximately 2½ complete cycles. Further because of the sinusoidal nature of alternating voltage, each cycle of voltage is referred to as a period of 360°. A half cycle is referred to as an angle of 180° and a quarter cycle as a phase angle of 90°. Selecting the beginning of curve 51 where the voltage is zero and going positive as zero degrees, as is conventional and as indicated in the figure, the voltage increases positively to a peak at 90°, thereupon decreases to a level of zero at 180°, decreases negatively to a maximum negative voltage subsequently at 270° and thereupon reduces to zero again at 360° which is the zero degrees for the next succeeding cycle of the alternating voltage wave form.

The foregoing relationship between phase angle and alternating voltage is well understood to those skilled in the art. For readers less versed in this particular method of nomenclature, reference may be made to any conventional well known literature and test on alternating current transformers or machinery.

I have found in one particular oven power supply construction, as is hereinafter explained in greater detail, that it is desirable to initiate current flow in the power supply circuit at such times as the phase angle of the alternating voltage is between approximately 130° and 220°, and between 310° of one cycle and 30° of the next succeeding AC cycle. Stated negatively, I have found, as illustrated in the figure, that it is undesirable to initiate current flow in primary winding 9 of transformer 11 when the phase of the alternating voltage of the supply is between approximately 30° and 130° or between 220° and 310°. The desirable current initiation angles for such an oven design are indicated in the figure by the slanted or shaded areas and are otherwise conveniently labeled in a time chart. In another particular oven power supply construction I have found it desirable to start current flow at phase angles of between 25° and 60°. Thus it is understood that the foregoing description is merely illustrative of the procedures involved and that the particular phase angle selected as preferably differs from one oven power supply design to another.

While the foregoing description is adequate to enable one skilled in the art to make and use my invention, it is helpful to present and consider a more specific embodiment which illustrates the selection of circuits and components in a configuration as described as well as presenting additional novel aspects that are useful in my invention.

One specific embodiment of my invention as illustrated in FIG. 3 includes power lines L1 and L2 for connection to a source of alternating current, suitably the 120-volts 60-cycle AC that is available from a conventional home electrical outlet. For convenience of discussion, line L2 is considered to be the electrical common or ground. A protective fuse 201 and switches 223 and 224 are connected electrically in series with line L1. Switch 223 is an On-Off switch with normally open contacts to prevent completion of an electrical circuit until operated to its closed position. Switch 224 is a conventional electrical interlock switch that is mechanically linked to and controlled by the oven door, not illustrated, so that if the door is not fully closed the microwave power source cannot be energized. Siwtch 225 is an additional electrical interlock switch with contacts that close to complete a circuit only when the oven door is fully closed. The mechanical linkages to as well as the oven cavity door are well known and need not be illustrated. Suitably the operation of switches 225 and 224 are mechanically adjusted so that switch 224 opens or closes its switch contacts only after switch 225 has first opened its contacts so that switches 223 and 224 operate to interrupt a circuit only under an electrical "no-load" condition, as later becomes apparent, and cannot arc or burn out their contacts.

The primary winding 252 of a power transformer 253 is connected electrically in series with the anode terminals of a conventional Triac semiconductor switch 251, which I term a solid state synchronous switch, located in circuit between interlock switch 224 and electrical ground at line L2.

Power transformer 253 includes a high voltage secondary winding 254, suitably on the order of 1.7 KV and a low voltage heater secondary winding 255. In a greatly simplified schematic drawing, secondary 254 is connected to a coventional half wave voltage doubler circuit consisting of capacitor 256 and rectifier diode 257 and the output of the doubler is connected between the cathode and anode of a magnetron 258. The heater winding is connected to the magnetron heater. Symbolically illustrated, transmission line 259 couples the output of magnetron 258 to the oven cavity 260. Other electrical elements of the oven which require and consume electricity, not illustrated, which would form part of the electrical load, are connected effectively in parallel with primary winding 252.

An initial cycle phase selector circuit, as I have termed such, includes diode rectifier 203 which is connected electrically in series with resistor 204 and Zener diode 205 across lines L1 and L2. A selectively adjustable resistor 206 is connected between the cathode terminal of Zener diode 205 and the emitter electrode of unijunction transistor 207. Capacitor 208 is connected between the emitter of transistor 207 and line L2. Capacitor 210, resistor 211, and resistor 212 are connected electrically in series across lines L1 and L2. A diode 213 is connected in series with a Zener diode 214 and a resistor 215 between the junction of resistors 211 and 212 and the base 2 electrode of unijunction transistor 207. Resistor 216 is connected between the base 1 electrode of unijunction transistor 207 and line L2. A resistor 217 is connected between the base 1 electrode of transistor 207 and the trigger terminal of a silicon controlled rectifier, abbreviated SCR, 218. Resistor 219 is connected between line L1 and the positive polarity terminal of SCR 218 and a second resistor 220 is connected between the negative polarity terminal of the SCR and ground.

Coupling capacitor 221 is connected between the negative polarity terminal of SCR 218 to the trigger input terminal of silicon controlled rectifier, SCR, 222 which forms part of what I term the latch circuit.

The latch circuit includes a rectifier diode 226, resistor 227, resistor 228, connected electrically in series between interlock switch 225 and the positive polarity terminal of SCR 222. Resistor 229 is connected between the negative polarity terminal of SCR 222 and line L2. An additional resistor 230 is connected between the trigger terminal of SCR 222 and the negative polarity terminal of SCR.

A Zener diode 231 is connected between the juncture of resistors and line L2 in parallel with a series network of resistor 235 and capcitor 236 and these function electrically as part of the latch circuit as well as the electronic timer and "unlatch" circuit now described.

The timer includes a field effect type transistor, abbreviated FET, 244. The base 2 electrode of FET 244 is connected via lead 242 to the juncture of resistors 227 and 228 in the latch circuit. A silicon controlled rectifier, SCR, 237 has its positive polarity terminal connected to lead 242 and its negative polarity terminal connected to electrical ground at L2. The trigger input terminal of SCR 237 is connected to the base 2 electrode of unifunction transistor 239. A resistor potentiometer 240 is connected between lead 242 and electrical ground at L2. Potentiometer 240 has a positionable or movable tap 241 which is electrically connected to the base 1 electrode of unijunction transistor 239. A resistor 243 is connected between the base 2 electrode of 239 and ground. A resistor 245 connects the base 1 electrode of FET 244 to the control electrode of unijunction transistor 239. The emitter electrode of FET 244 is connected electrically in common with the emitter electrode of unijunction transistor 239. A capacitor 247 is connected between emitter electrode of transistor 239 and eletrical ground at line L2. A resistor 250 connects the trigger terminal of Triac 251 to the negative polarity terminal of SCR 222.

FIG. 4 illustrates the voltage wave forms which appear at various parts of the described circuit. These voltage representations are considered in connection with the operation of the specific embodiment of FIG. 3 to assist in understanding of the latter.

In operation of the specific embodiment of FIG. 3, 120-volt 60-cycle Ac is applied across lines L1 and L2 over the oven power cord which is inserted into the conventional home electrical outlet. On the half cycles of AC in which the voltage on line L1 is negative relative to that on L2, diode 203 prevents current flow. However, when the voltage on L1, designated $e_{l1}$ in FIG. 4, is positive relative to that on L2 on one-half the AC cycle, current flows from L1 through diode 203, resistor 204 and Zener diode 205 to L2. The Zener diode is reverse biased as is conventional and establishes an essentially constant voltage drop across its terminals, suitably 25 volts by example, over the half cycle of AC and this voltage, designated $e_{z1}$ in FIG. 4, is independent of line voltage. The voltage establishes a current through adjustable resistor 206 and this current charges capacitor 208 over an interval of time. Resistor 206 and capacitor 208 form a conventional RC circuit with a time constant, T, of 1/RC, the time necessary to charge capacitor 208 up to approximately 67 percent of the voltage across Zener diode 205. The voltage across capacitor 208, designated $e_e$ in FIG. 4, as it is building up is applied to the emitter of unijunction transistor 207.

In another part of the circuit, current also flows between lines L1 and L2 via a separate circuit network consisting of the capacitor 210, resistor 211, and resistor 212. The capcitor and resistor form a conventional phase circuit by which the voltage at the juncture of resistors 211 and 212, designated $e_2$ in FIG. 4, is "leading" in phase relative to the phase of the sinusoidal AC voltage between lines L1 and L2. By a suitable selection of capacitor and resistors, the voltage is advanced in phase by approximately 45° in one example, and is dropped or reduced to a lower voltage level, suitably 30 volts. The leading alternating voltage is rectified by diode 213 and Zener diode 214, reverse biased, reduces the rectified voltage by the characterisitic Zener constant saturation voltage for the particular diode, in this example 10 volts. The voltage, now reduced to 20 volts approximately, designated $e_b$ in FIG. 4, is thereafter applied via resistor 215 to base 2 electrode of unijunction transistor 207.

In using a phase leading circuit, the voltage $e_b$ at base 2 of the unijunction transistor is always positive at the time of arrival of the positive 60-cycle pulse at the emitter circuit. This prevents premature firing of the unijunction transistor 207.

At the time that the voltage applied from capacitor 208 to the emitter of 207, during the AC half cycle, reaches 80% approximately of the voltage applied at base 2 of transistor 207, the unijunction transistor 207 switches into its electrically conducting state. Accordingly, current flows between base 2 of the transistor through base 1 and resistor 216 to line L2 and, concurrently, current flows out of capacitor 208 to the emitter and through base 1, resistor 216 to line L2. This latter current continues until capacitor 208 is discharged. At that time unijunction transistor 207 restores to its nonconducting state. During this same half cycle of voltage on line L1 capacitor 208 again commences to charge through resistor 206. The process by which the unijunction transistor 207 conducts and discharges capacitor 208 and thereupon restores to the electrically nonconductive state continues over and over again many times during each AC half cycle because the time constant, T, is relatively short in comparison to the time or period of one-half of the 60-cycle voltage.

It is noted that without the phase shift circuit of capacitor 210 and resistor 211, unijunction transistor 207 would become conducting or "fire" initially only when the voltage on line L1 is of a phase of approximately zero. In addition, each time unijunction transistor 207 switches into its conducting state, a voltage drop is created across resistor 210 to provide an output voltage or signal representative of the preset phase delay or time interval, as it may be variously viewed.

The output voltage at base 2 is applied via resistor 217 to the trigger terminal of SCR 218. Almost instantaneously, SCR 218 switches into its current conducting state and current flows between line L1, resistor 219, through the SCR, and resistor 220 to line L2. An output voltage or signal is generated across resistor 220.

The SCR is a conventional semiconductor device which possesses the characteristic that when triggered into its electrically conductive state, it conducts current thereafter independently of any change in the signal at the trigger terminal and conducts such current until the current therethrough reduces to zero, typically when the polarity of the voltage applied to its anode-cathode terminals reverses direction and such reversal occurs twice during every full cycle of AC line voltage. Thus although unijunction transistor 207 continues to generate pulses during the half cycle of AC across lines L1 and L2, SCR 218 provides a signal only upon the first one of such pulses. An output pulse thus is provided at the output of SCR 218 at the appropriate selected phase angle of the alternating current line voltage, and in this the circuit can be termed an "initial cycle phase selector."

As is evident, resistor 206 can be adjusted to different values to vary the charging time of capacitor 208; to vary the delay or time interval at which unijunction transistor 207 initially is fired and hence to correspondingly change the phase angle at which SCR 218 provides an output, and this is described hereinafter in greater detail. The initial cycle phase selection circuit repeats this operation as long as the oven power cord remains in the electrical outlet. As is apparent however, it is possible to include in circuit in series with line L1, an additional electrical switch, suitably a second On-Off switch, so as to permit the line voltage to be removed from the circuits of this initial cycle phase selector, if such addition is desired by the oven manufacturer.

With the contacts of electrical interlock switches 223 and 224 in the closed position, as occurs in normal operation of the oven, the line voltage across L1 and L2 is applied to the microwave oven components including the primary winding of the transformer 253 electrically in series with the Triac switch 251. The Triac does not conduct current until a suitable voltage is applied at its trigger input terminal, as discussed in connection with the more generalized embodiment of FIG. 1. Hence the series current path through the Triac remains open and no current flows through the transformer primary winding.

The cooking time is selected, as is hereinafter discussed in greater detail, by adjustment of the position of the movable tap 241 of a calibrated resistor 240, which forms part of an electronic timer circuit. The food to be cooked is inserted in the oven cavity 260, symbolically illustrated, and the oven door, not illustrated, is closed. In closing the oven door switches 224 and 225 close their contacts. Closing of switch 225 completes a circuit from line L1 to rectifier diode 226, which conducts current only on the positive AC half cycle, and this prepares a current path through resistor 227, resistor 228 to the positive polarity terminal of SCR 222, the negative polarity terminal of this SCR, resistor 229 to line L2. Each time that the initial cycle phase selector circuit provides an output pulse, the pulse is applied to the trigger input terminal of SCR 222 through capacitor 221. At the appropriate phase angle of line voltage as established in the phase selector circuits, the pulse is applied via capacitor 221 to the trigger input of SCR 222 which then switches into its conducting state and conducts current. With current through resistor 229 a voltage appears across resistor 229 which is applied to the trigger input terminal of SCR 222 via resistor 230 in a type of feedback circuit. Additionally, the voltage across resistor 229 is applied via resistor 250 to the trigger input terminal of Triac switch 251.

SCR 222 remains conducting after it is initially fired as a consequence of the energy stored in capacitor 236, whose discharge rate is determined additionally by resistors 228 and 235. SCR 222 will stop conducting after switch 225 is opened or after the timer functions to discharge capacitor 236, as described later.

Triac 251 switches into its conductive state almost simultaneously to complete the current conducting circuit through the primary winding 252 of the microwave source power supply.

The Triac is a conventional semiconductor switching device which is bi-polar and conducts current in either direction, positive or negative. In addition, it possesses the characteristic of the silicon controlled rectifier in that once fired by application of an appropriate pulse voltage to its trigger input terminal it remains conducting regardless of any change at the trigger input up to and until such time as the voltage across the Triac reverses in polarity. In effect, the Triac is equivalent to two silicon controlled rectifier components connected in parallel with their positive and negative polarity terminals reversed. Current additionally flows through resistor 227 and through Zener diode 231 to line L2. The Zener diode is reversed biased and hence provides a constant voltage across its terminals which in an example may comprise 30 volts. This 30 volts is applied to the series network of resistor 235 and capacitor 236 to charge the capacitor to that voltage level. The time constant of the resistor capacitor network is sufficiently large so as not to permit the capacitor to discharge through the SCR during the alternative halves of the AC voltage during which diode 226 prevents current flow between L1 and L2 through SCR 222. The circuit as described initiates the flow of current through the transformer primary winding and maintains the Triac switch 251 biased for current condition and this circuit may be referred to as a "latch."

With Triac 251 switching into its conductive state at the appropriate phase angle during a positive AC half cycle and thereafter conducting current on each additional subsequent half cycle, alternating current flows through primary winding 252 as well as any other electrical component, not illustrated, connected in parallel with the primary. In the conventional manner, the voltage across the primary winding is reduced by transformer action to a heater voltage, 4.3 volts by example, which in turn powers the heater of magnetron 258 and the primary voltage is stepped up to a large level, suitably 1.7 kilovolts which appears across secondary 254. In turn, this high voltage is doubled and rectified by capacitor 256 and diode 257 doubler circuit and applied across the anode and cathode of the magnetron. Conventionally, magnetron 258 generates microwave energy which is taken from the magnetron and fed via transmission line 259 into the cooking cavity 260 where the microwave energy radiation cooks the food. This continues until such time as the time set on the electronic timer expires.

The voltage at the juncture of resistors 227 and 228 is also applied across SCR 237, resistor 240 and the series connection of field effect transistor 230, resistor 245 and capacitor 247. Field effect transistor 230 is connected as a constant current source and current flow between its base and collector electrodes charges capacitor 247 over a predetermined period of time. Concurrently by means of the adjustable tap 235 of potentiometer 240, the base 1 electrode of unijunction transistor 239 is biased to a predetermined voltage level. The relationship between the position of the tap 235 and the cooking time may be indicated by a mechanical calibration or other indicia in the mechanical assembly. As soon as the voltage across capacitor 247 increases to approximately 80 percent of the value of the voltage applied to base 1 via tap 241, unijunction transistor 239 fires and conducts current between base 1 and base 2 and between its emitter electrode and base 2 and through base 2 through resistor 243 to ground. The voltage across resistor 243 is coupled to the trigger input terminal of SCR 237, and SCR 237 switches into its conductive state and thereby forms a very low resistance network between the juncture of resistors 227 and 228 and line L2. In effect, SCR 237 shunts SCR 222 of the latch circuit and SCR 222 restores to its nonconducting state signifying completion of a cooking cycle. SCR 237 continues to conduct current until switch 225 is opened. The oven door is opened to remove the cooked food and in so doing switches 224 and 225 are opened. This permits SCR 237 to revert to its nonconductive state and prepares SCR 231 to operate again in a subsequent cooking cycle.

Unijunction transistor 239 resoores to its nonconductive state immediately when it has fired and also remains latched "off" while SCR 237 is conducting to shunt current from SCR 222. Thus Triac 251 restores to its nonconductive state or "off" and remains off until the oven door opens and recloses S-224, when the timing cycle is re-initiated unless switch S-223 has been manually deactivated. On the other hand, if the door is opened before the end of the timer cycle to stir or observe the cooking, the re-closing of the door allows the timing cycle to continue from the point of interruption to the time set for completion.

Curve 1 of FIG. 5 illustrates the peak value of a 60-cycle plus DC voltage which appears across the magnetron during the initial cycle or cycles of AC as a function of the line voltage phase angle at the time current is permitted to flow in the primary winding of the power transformer. This particular voltage results from the magnetic condition of the power transformer core. As is apparent, the level of this voltage which occurs only during the few initial cycles of applied alternating current, results in voltages of between 4.76 to 6 kilovolts depending upon the phase angle of the alternating voltage at turn-on. This voltage contrasts with the level of approximately 3.5 kilovolts indicated by dash line 3 as the steady state condition, which is the normal level of voltage that is desired and results once power supply conditions have stabilized and with which the microwave magnetron is designed to operate. Curve 2, which is broken in parts, illustrates an additional voltage, which I term the "transient spike voltage," that is found to occur and appears across the magnetron during the initial half cycle of applied alternating voltage as a function of the line voltage phase angle at the time current is permitted to flow in the primary winding of the power transformer. I have discovered that this spike exists in addition to the voltage illustrated in curve 1 and is substantially a function of the phase angle at which the alternating voltage is applied to the transformer primary winding. Thus in the specific example, the spike voltage at approximately 110° phase angle produced a spike of 7 kilovolts which is substantially higher than the steady state voltage of 3.5 kilovolts. At approximately 300° phase angle this spike again reached 7 kilovolts. It is noted that in the range between 120° and 137° the spike voltage was not large enough to become measurable and "disappears." Likewise, between 150° and 270° the spike voltage was not measurable and is presumed to be very small. At zero degrees the spike voltage produced appears to be approximately 5 kilovolts. The level of the spike rises very rapidly as a function of the phase angle to approximately 6.75 kilovolts at a phase angle of 20°.

The large level "spike" voltages create unnecessary voltage stresses upon both the magnetron and the power supply diode or diodes and can result in premature failure of those components. As is apparent from FIG. 5, the region between approximately 120° and 140° phase is desirable in the selected oven example. The region between zero and 10° appears acceptable, and the region between 150° and approximately 260° phase appears very desirable. Obviously, the voltages of curve 1 60-cycle plus DC voltage is an additional factor to be considered but, as is apparent, it varies in level but cannot be avoided. From the standpoint of this 60-cycle plus DC voltage it would be best to effect current flow at approximately 100° and would be least desirable to turn on the current at 300°; the range between 150° and 260° appears acceptable from this standpoint.

I have also discovered in connection with the elimination of the transient spike voltage that the in-rush current is also dependent upon the phase angle of the alternating voltage at the commencement of current flow. Curve 1 of FIG. 6 shows that the in-rush current peaks at approximately 70° phase angle and again at approximately 250° phase angle reaches approximately $45 \times \sqrt{2}$ amps. By comparison, the steady state current for which the unit is designed to operate and which occurs regardless of the phase angle of turn-on once the power supply and electrical load have stabilized, is approximately $15 \times \sqrt{2}$ amps as indicated by dash line 2 in FIG. 6. From the standpoint of minimal in-rush current during the first half-cycle of applied alternating current, the range between approximately 28° to 40° appears desirable; the range between 100° to 330° appears desirable in that at those phase angles at current turn-on the in-rush current are approximately of the same levels as the current in the steady state condition. However, although a minimal initial in-rush current results from turn-on at 30° phase angle for example, it is seen, given reference to FIG. 5, that the transient spike voltage is nearing a maximum of almost 6.7 kilovolts. Thus while the phase angle of 30° would appear to be desirable from the standpoint of low initial in-rush current, it is not desirable when considered in connection with the transient voltage spike.

The preferred range of turn-on phase angle where both the in-rush current is of the desired low level and the transient voltage spike is minimal appears to be in the range between 150° to approximately 220° phase angle, or, stated otherwise, the last 30° of the positive half cycle of alternating current and the succeeding 40° of the next successive negative half cycle of alternating current for a given oven power supply.

Obviously, the results depicted in FIGS. 5 and 6 may vary in specific phase angles from oven to oven in the results obtained. However, as will be apparent, voltage spikes will always be produced as well as variations in in-rush current as a function of the phase angle at which the current is turned on. And thus a chart similar to that depicted in FIGS. 5 and 6 can be made for each oven or each oven design. With the particular specific embodiment in hand and with the results derived in accordance with the teachings of this invention, the optimal or best desired phase angle at which turn-on should be made is determined and the phase angle detector network in the oven power supply circuit will accordingly be set to trigger operation at a most desirable phase angle. This may be done empirically with each oven by including an adjustable phase delay resistor such as 83 in figure, or, if the results from oven to oven provide some particular phase angles at which consistent results are obtained, the value of resistance determined to produce the necessary delay is installed in the phase delay network to produce current turn-on at the proper phase angle.

The specific embodiment of the invention of FIG. 3 inherently includes an additional advantage and function not previously discussed or illustrated in the basic embodiment of FIG. 1 and reference may again be made to FIG. 3. In this the initial cycle phase selector circuit is functionally dependent upon the level of the line voltage, the AC voltage provided across lines L1 and L2.

As previously noted in connection with FIGS. 5 and 6, the in-rush current and the transient spike voltage while dependent upon the phase at which primary current is permitted to flow is also dependent on the level of the line voltage. FIGS. 5 and 6 illustrate the results obtained respecting transient spike voltage and in-rush current for a given microwave oven load and for a given line voltage of 120-volts AC. As is known, however, the level of line voltage can fluctuate between 130-volts RMS AC down to as low as 100-volts AC RMS dependent upon many factors relating to distribution and generation of electricity by the local utility companies. When the line voltage increases, the voltage $e_2$ increases. This is the voltage which appears across the juncture of resistors 211 and 212. As previously explained, Zener diode 214 subtracts 10-volts from the voltage $e_2$ and the remaining voltage is applied as $e_b$ to the base 2 electrode of unijunction transistor 207. By way of example, with 130-volts RMS applied across the power lines, the voltage at $e_b$ is net 20-volts with 100-volts applied across the power line, the voltage at $e_b$ is reduced to 10-volts. Percentagewise the change in voltage $e_b$ applied to base electrode 2 of transistor 207 is substantially greater than the percentage change in line voltage. As previously discussed, the rate of charge of the capacitor 208 is essentially a constant inasmuch as the voltage across Zener diode 205 is essentially constant. Thus the time required for the voltage at the emitter electrode of transistor 207 to reach a level of approximately 80 percent of the voltage $e_b$ at base 2 is thereby increased. As a result the initial phase angle derived from or corresponding to this time delay is retarded as I have determined is required as the line voltage increases. The change in phase angle or phase angle variation is adjusted to match the requirements of a given microwave oven design and obviously many alternative designs for the time delay and phase control circuits, as becomes apparent to one skilled in the art, can be substituted for that illustrated in my specific embodiment. By way of example, the variation in phase angle for one particular type of oven as a function of the voltage is plotted in FIG. 7 in the line voltage versus phase plane as contours of constant line in-rush current. The desired phase is shown by the straight line from 60° at 130-volts RMS to 28° at 200-volts RMS. Thus in FIG. 7, curve A represents a 20-amp in-rush current curve. A corresponding curve B also represents an in-rush current characteristic of 20-amps. Curves C and D form contours of 15-amp in-rush current. The straight line curve represents the preferred phase line for the specific oven as measured; 0.1 represents the measured phase at 100-volts, 4.1 KV transient at approximately 30.6°; .2 represents 110-volts at 34.2°; 0.3 represents 120-volts at approximately 50.5° and 5.1 KV transient voltage; 0.4 represents 130-volts and 60° at a transient voltage of 5.5 KV. As is apparent, all of the points fall within the allowable limits for in-rush current of 15-amperes or less. The transient voltage of 5.5 KV max. position highest line voltage is within acceptable limits and as the line voltage decreases the transient voltage is reduced to even more preferred levels.

In prior art microwave oven construction the instant of current turn-on to the microwave source was random, dependent upon the actual closure of the cooking switch or timer contacts which were not in any way synchronized with the line voltage, and could occur at any phase angle of the line voltage, sometimes falling within the range of angles herein determined as desirable and sometimes not. The spike voltage was thus illusory if it was at all observed. In the practice of my invention the spike voltage is discovered and eliminated by affirmative means and the reliability and useful life of the microwave oven is further improved.

The details of the preferred embodiment of my invention are presented to enable one skilled in the art to understand my invention and the manner in which the invention may be constructed and used. Those details are not to be construed in a limiting sense, inasmuch as equivalents and modifications, which do not depart from the teachings of my invention, suggest themselves to one of ordinary skill in the art upon reading this specification.

Accordingly, it is expressly understood that my invention is to be broadly construed within the spirit and scope of the appended claims.

What I claim is:

1. In a microwave oven, the combination comprising:

a pair of lines for connection to a source of alternating voltage to provide an alternating voltage;

a magnetron for generating microwave energy;

a transformer, said transformer having an iron core, a primary winding mounted on said core, and at least one high voltage secondary winding mounted on said core;

diode rectifying means coupled to said high voltage secondary winding and said magnetron for applying direct voltages to said magnetron;

said magnetron, transformer, rectifying means combination resulting in a large transient voltage spike across said magnetron and a large in-rush current to said magnetron when the alternating line voltage is applied across said primary winding at a first predetermined phase angle of said alternating voltage and wherein said transient voltage and in-rush current is minimized substantially when said alternating line voltage is applied across said primary winding at a second predetermined phase angle of said alternating voltage;

solid state semiconductor switch means having a pair of main terminals and a trigger input terminal, said switch having the characteristic of being electrically nonconductive between its main terminals until triggered by an input at said trigger input terminal and thereupon becoming substantially instantaneously electrically conductive between said main terminals independently of any further inputs until the current flow through its main terminals reverses in direction or ceases and thereupon substantially instantaneously becoming nonconductive until triggered again at its input terminal;

first electrical switch means for opening and closing an electrical circuit;

circuit means connecting said first switch means, said primary winding and the main terminals of said semi-conductor switch electrically in series circuit across said pair of lines, whereby current cannot flow through said primary winding until said switch means closes and said semiconductor switch is in its conductive state;

control circuit means coupled to said trigger input terminal of said semiconductor switch means, said control circuit means including:

synchronizong circuit means responsive to said alternating voltage for providing an output synchronized with said second predetermined phase angle of said alternating voltage, latch circuit means coupled to said synchronizing means and to said semiconductor switch means responsive to said output of said synchronizing means for triggering said semiconductor switch means into its conductive state and thereafter for maintaining said semiconductor switch means in its current conducting state during subsequent half cycles of said alternating voltage;

and selectively adjustable timer means coupled to said control means for inhibiting operation of said control means at the expiration of a preselected interval of time to cause said semiconductor switch to revert to its electrically nonconductive state;

whereby said semiconductor switch means permits current in said series circuit to commence only at a predetermined phase angle of alternating voltage and continues to permit current flow during each succeeding half cycle of alternating voltage over the inverval of time selected with said timer means.

2. The invention as defined in claim 1 wherein said synchronizing means further includes:

means responsive to the level of said alternating voltage for adjusting said predetermined phase angle to different values as a function of the level of said alternating voltage.

3. The invention as defined in claim 1 wherein said synchronizing means comprises:

an input coupled to said alternating voltage;

unijunction transistor means having a first base electrode, a second base electrode, and an emitter electrode;

first bias circuit means coupled between said first base electrode and said input;

output circuit means coupled to said second base electrode responsive to current flow through said unijunction transistor for providing an output;

first circuit means coupled to said input for establishing at an output a single polarity voltage of a predetermined level only during alternate ones of the half cycles of said alternating voltage;

an RC circuit comprising a resistance, R, and a capacitance, C, said RC circuit having a time constant, T, equal to 1/RC, and said time constant is less than T1, where T1 equals the time period of one-half cycle of said alternating voltage;

means connecting said RC circuit to said output of said first circuit means to permit said capacitor C to charge up to a predetermined voltage level over a predetermined period of time within each half cycle of said alternating voltage;

means coupling said capacitor, C, to said emitter electrode for applying said voltage on said capacitor to said emitter;

silicon controlled rectifier means having an anode, cathode and trigger terminal;

means connecting said silicon controlled rectifier anode to said input;

circuit means connecting the output of said unijunction transistor to said trigger terminal for triggering said silicon controlled rectifier into its current conducting state;

whereby said silicon controlled rectifier provides an output at a predetermined time initiated only once within each alternate positive half-cycle of alternating voltage applied to said input which corresponds in time to a predetermined phase angle of said alternating voltage.

4. The invention as defined in claim 3 wherein said first bias circuit means comprises:

filter circuit means coupled to said input for providing a second alternating voltage having a phase angle advanced by a predetermined number of degrees relative to the phase angle of said applied alternating voltage and of a substantially lower voltage level relative to the level of said alternating voltage; and rectifier means coupled to said first base electrode of said unijunction transistor means for applying a pulsed direct voltage to said first base electrode of said unijunction transistor;

whereby said unijunction transistor switches into its electrically conductive state only at a time during which the phase angle of said alternating voltage is other than zero.

5. The invention as defined in claim 4 wherein said rectifier means comprises further:

a first diode for rectifying said second alternating voltage, a Zener diode for reducing said rectified voltage from said first diode and applied to said first base electrode by a predetermined substantially constant voltage level, which constant voltage level is within the range of one-half to one-fifth of the voltage output from said first diode, whereby any change in voltage level at said input results in a change in bias voltage at said second base electrode to vary the phase angle of said alternating voltage at which said unijunction transistor becomes current conducting.

6. The invention as defined in claim 5 wherein said control means includes a latching circuit for maintaining an output signal subsequent to initial energization, said latch circuit comprising:

second silicon controlled rectifier means having a trigger input terminal;

output means connected to said trigger input terminal of said solid state semiconductor switch means;

means for connecting said silicon controlled rectifier to said alternating voltage;

means for coupling the output of said first silicon controlled rectifier of said synchronizong means to said trigger input terminal of said second silicon controlled rectifier;

feedback circuit means, said feedback circuit means connected between said silicon controlled rectifier output and said trigger input terminal;

whereby said second silicon controlled rectifier switches from its non-conductive to its electrically conductive state in response to a signal from said synchronizing means and maintains said conductive state.

7. The invention as defined in claim 6 further comprising interlock switch means responsive to movement of said door from the closed position for opening an electrical circuit, said second switch being connected electrically in series with said second silicon controlled rectifier, whereby said latch circuit is de-energized upon opening of said oven door.

8. The invention as defined in claim 7 further comprising mechanical operator means coupled between said door and said first and second switch means for preventing opening or closing of said first switch means until subsequent to opening or closing of said second switch means.

9. The invention as defined in claim 6 wherein said selectively adjustable timer means includes switch means operable to close a circuit upon the lapse of a predetermined cooking time interval, said switch means connected across said second silicon controlled rectifier for shunting said second silicon controlled rectifier upon the expiration of said predetermined interval of time, whereby said second silicon controlled rectifier restores to its electrically nonconductive state and further output from said second silicon controlled rectifier to said semiconductor switch means is inhibited.

10. The invention as defined in claim 6 wherein said timer means is coupled to said second silicon controlled rectifier for terminating operation of said second silicon controlled rectifier subsequent to the expiration of a predetermined interval of time.

11. The invention as defined in claim 9 wherein said timer means comprises:
 a positive polarity terminal and negative polarity terminal;
 a timing capacitor;
 means responsive to the voltage across said terminals for providing a constant current to said capacitor and for charging said capacitor at a constant rate of current flow whereby a corresponding voltage is built up across said capacitor over a period of time;
 unijunction transistor means, said unijunction transistor means having a first base electrode, second base electrode, and emitter electrode;
 first resistor means coupling said second base electrode to said negative polarity terminal;
 means coupling said timing capacitor to said emitter electrode;
 second electrical resistance means having first and second terminals and a selectively adjustable tap terminal, said first and second terminals coupled to said positive and negative polarity terminals, respectively, and said tap terminal being coupled to said first base electrode for establishing a direct voltage at said first base electrode;
 whereby said unijunction transistor means switches from an electrically nonconductive state to an electrically conductive state when the voltage built up on said capacitor means attains a predetermined ratio to the voltage established at said first base electrode to generate an output voltage across said second resistor means at the expiration of a predetermined time interval subsequent to the application of a voltage across said positive and negative polarity terminals.

12. The invention as defined in claim 9 wherein said timer operated switch means comprises a third silicon controlled rectifier connected in circuit across said second silicon controlled rectifier to provide a shunt current path around said second silicon controlled rectifier.

13. The invention as defined in claim 11 further comprising door switch means responsive to the oven door being in the closed position for completing a circuit for applying a voltage across said positive and negative polarity terminals.

14. In a microwave oven the combination comprising:
 a cooking cavity for exposing food to microwave energy, said cavity having an opening to provide access thereto;
 a movable door for closing said opening;
 a magnetron for generating microwave energy;
 means for coupling microwave energy from said magnetron into said cooking cavity;
 a pair of lines for connection to a source of alternating voltage;
 a transformer, said transformer having an iron core, a primary winding mounted on said core, and a high voltage secondary winding mounted on said core to provide a high alternating voltage from said secondary winding during alternating current flow in said primary wiring;
 rectifier means, including at least one diode, coupled between said high voltage secondary winding and said magnetron responsive to alternating voltage from said secondary winding for applying direct voltages to said magnetron;
 said magnetron, transformer, rectifying means combination resulting in a large transient voltage spike across said magnetron and a large in-rush current to said magnetron when the alternating line voltage is applied across said primary winding at a first predetermined phase angle of said alternating voltage and wherein said transient voltage and in-rush current is minimized substantially when said alternating line voltage is applied across said primary winding at a second predetermined phase angle of said alternating voltage;
 first switch means coupled to said movable door, said switch means having contacts movable between an open and closed circuit position for closing a circuit through said contacts only when said door is in the closed position;
 semiconductor switch means having a control terminal and having an electrically nonconductive state and an electrically conductive state and capable of switching between said nonconductive and said conductive state substantially instantaneously and responsive to a signal at said control terminal for switching into the conductive state and responsive to an effective zero current flow and an absence of a signal at said control terminal for switching back to its nonconductive state;
 first series electrical circuit means connecting said first switch means, said primary winding and said semiconductor switch means electrically in series circuit across said lines;
 control circuit means coupled to said semiconductor switch means responsive to alternating voltage at a predetermined location in said series circuit for providing a signal to said control terminal of said semiconductor switch means to cause said semiconductor switch means to switch from its nonconductive state into its electrically conductive state only at said second predetermined phase angle, $\theta$, of said alternating voltage and for thereafter maintaining said semiconductor switch means in said electrically conductive state; and
 selectively adjustable timer means for inhibiting said control means at the expiration of a predetermined interval of time so as to permit said semiconductor switch means to restore to its electrically nonconductive state.

15. The invention as defined in claim 14 further comprising:
- second switch means, said second mechanical switch means being coupled to said oven door for operation to a first position only when said movable door is in its closed position; and
- said second switch means being electrically coupled between said first series circuit and said control circuit means for inhibiting said control circuit means when said switch is not in said first position.

16. The invention as defined in claim 15 further comprising:
- means for sequencing said second switch means together with said first switch means for operating said second mechanical switch means prior to operating said first mechanical switch means.

17. In a microwave oven the combination comprising:
- a cooking cavity for exposing food to microwave energy, said cavity having an opening to provide access thereto;
- a movable door for closing said opening;
- a magnetron for generating microwave energy;
- means for coupling microwave energy from said magnetron into said cooking cavity;
- a pair of lines for connection to a source of alternating voltage;
- a transformer, said transformer having an iron core, a primary winding mounted on said core, and a high voltage secondary winding mounted on said core to provide a high alternating voltage from said secondary winding during alternating current flow in said primary wiring;
- rectifier means, including at least one diode, coupled between said high voltage secondary winding and said magnetron responsive to alternating voltage from said secondary winding for applying direct voltages to said magnetron;
- said magnetron, transformer, rectifying means combination resulting in a large transient voltage spike across said magnetron and a large in-rush current to said magnetron when the alternating line voltage is applied across said primary winding at a first predetermined phase angle of said alternating voltage and wherein said transient voltage and in-rush current is minimized substantially when said alternating line voltage is applied across said primary winding at a second predetermined phase angle of said alternating voltage;
- first switch means coupled to said movable door, said switch means having contacts movable between an open and closed circuit position for closing a circuit through said contacts only when said door is in the closed position;
- semiconductor switch means having a control terminal and having an electrically nonconductive state and an electrically conductive state and capable of switching between said nonconductive and said conductive state substantially instantaneously and responsive to a signal at said control terminal for switching into the conductive state and responsive to an effective zero current flow and an absence of a signal at said control terminal for switching back to its nonconductive state;
- first series electrical circuit means connecting said first switch means, said primary winding and said semiconductor switch means electrically in series circuit across said lines;
- control circuit means coupled to said semiconductor switch means responsive to alternating voltage at a predetermined location in said series circuit for providing a signal to said control terminal of said semi-conductor switch means to cause said semiconductor switch means to switch from its nonconductive state into its electrically conductive state only at a predetermined phase angle, $\theta$, of said alternating voltage and for thereafter maintaining said semiconductor switch means in said electrically conductive state;
- means for adjusting said phase angle, $\theta$, to different values as a function of the level of said alternating voltage; and
- selectively adjustable timer means for inhibiting said control means at the expiration of a predetermined interval of time so as to permit said semiconductor switch means to restore to its electrically nonconductive state.

* * * * *

PO-1050
(5/69)

UNITED STATES PATENT OFFICE
CERTIFICATE OF CORRECTION

Patent No.    3,780,252    Dated    December 18, 1973

Inventor(s)    Paul Wythe Crapuchettes

It is certified that error appears in the above-identified patent and that said Letters Patent are hereby corrected as shown below:

Title of patent "Microwave Oven Power Supply Circuit" should be -- Microwave Oven Power Supply Circuit with Phase Control Means --. In Column 1, line 35, between the words "output" and "the" insert -- of --. In Column 9, line 14, the word "test" should be -- text --. In Column 9, line 59, the word "siwtch" should be -- switch --. In Column 11, line 5, the word "unifunction" should be -- unijunction --. In Column 11, line 53, between the words "phase" and "circuit" the word -- shift -- should be inserted. In Column 15, line 24, "4.76" should read -- 4.75 --. In Column 16, line 21, between "100° to" and "330°" insert the following: -- 220° appears desirable; and the range between 280° to --. In Column 17, line 48, "200-volts" should read -- 100-volts --. In Column 19, line 25, the word "inverval" should be -- interval --.

Signed and sealed this 14th day of May 1974.

(SEAL)
Attest:

EDWARD M.FLETCHER,JR.
Attesting Officer

C. MARSHALL DANN
Commissioner of Patents